Oct. 26, 1965  G. McCONEGHY, JR  3,214,050
MATERIAL WAGON

Filed July 24, 1963  3 Sheets-Sheet 1

Inventor
George McConeghy, Jr
F. David ...Buchan
Attorney

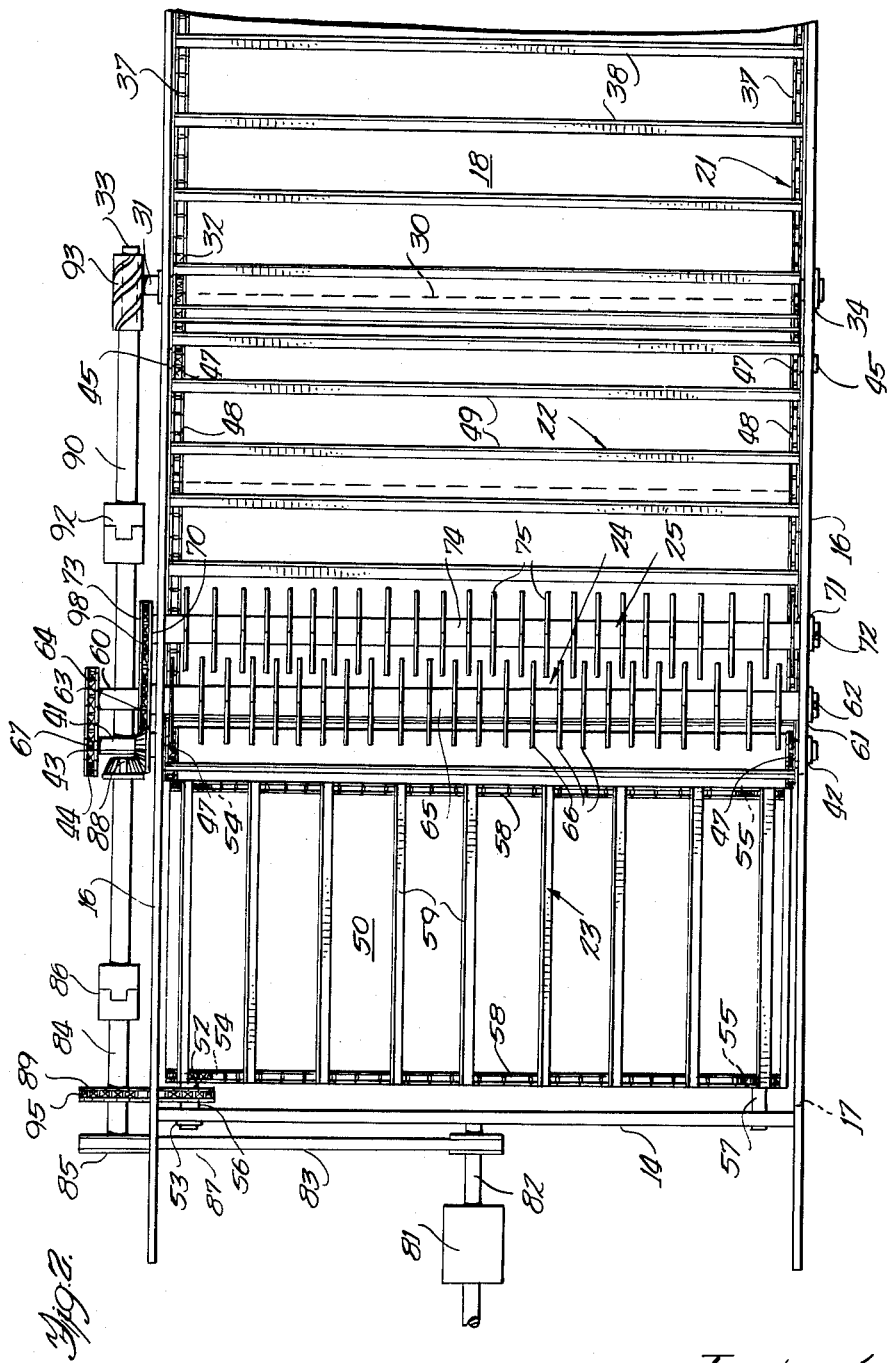

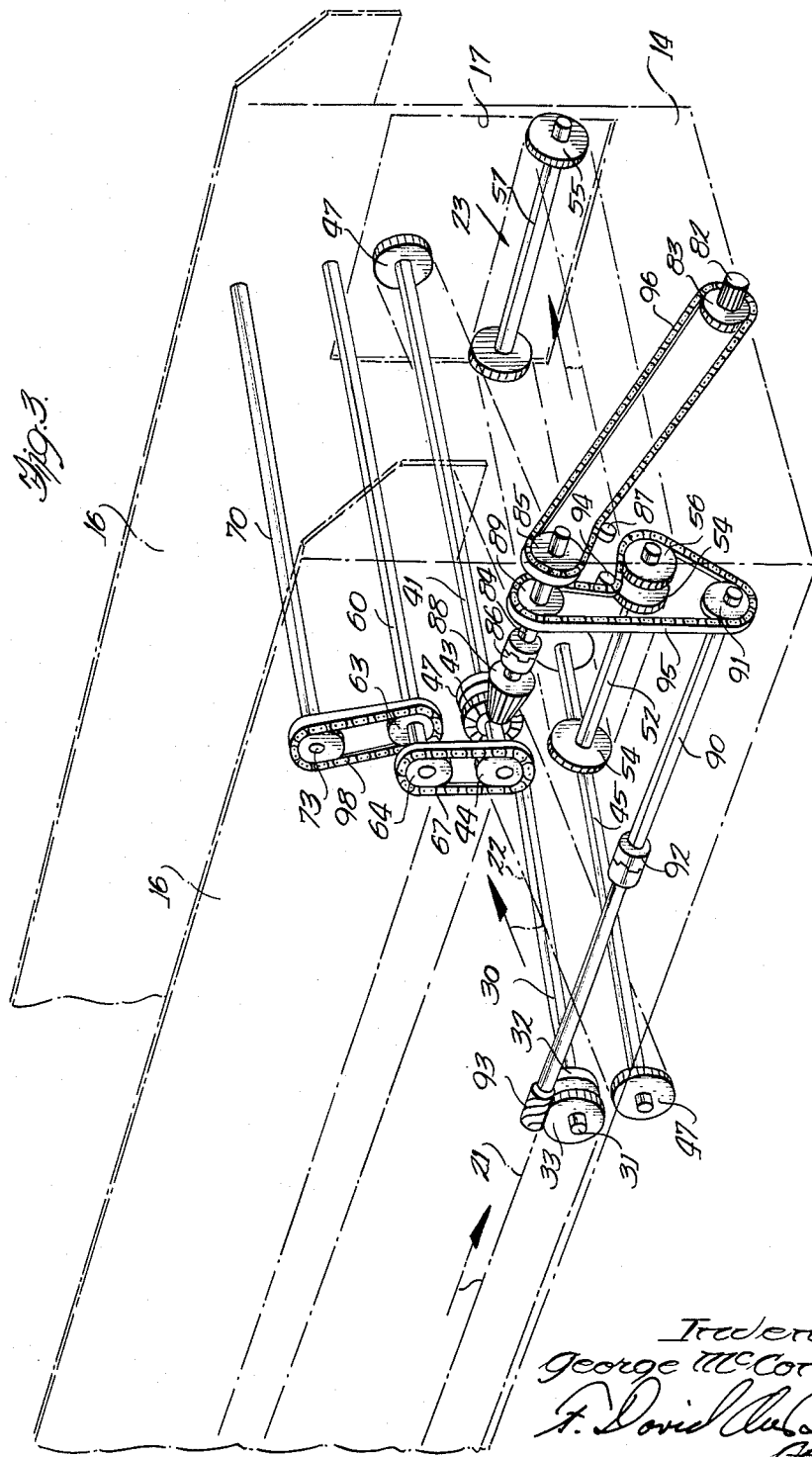

_United States Patent Office_

3,214,050
Patented Oct. 26, 1965

3,214,050
MATERIAL WAGON
George McConeghy, Jr., Oakville, Ontario, Canada, assignor to International Harvester Company, Chicago, Ill., a corporation of New Jersey
Filed July 24, 1963, Ser. No. 297,306
6 Claims. (Cl. 214—519)

The present invention relates generally to improvements in material wagons and the like, and more particularly to new and improved self-unloading vehicles adapted to handle bales, wafers, and forage.

Those concerned with the development of crop-material-handling means have long recognized the need for a self-unloading wagon that is adapted to handle bales, wafers, and forage. The present invention fulfills this need.

The general purpose of this invention is to provide a self-unloading wagon which embraces all of the advantages of similarly employed self-unloading wagons, and in addition can be used to unload randomly stacked bales and wafers. To attain this, the present invention contemplates a unique inclined conveyor cooperating with the bed conveyor to draw off or dislodge a portion of the bulk material and to then apportion it to the distributing conveyor. The versatility of the wagon is enhanced by providing it was readily installable and removable cutting and thrower beaters, to be utilized when forage materrial is being unloaded.

An object of the present invention is to provide a self-unloading vehicle that is adapted for use with bales, wafers, and forage.

Another object is to provide a self-unloading wagon that is adapted to unload randomly stacked bales without injuring the bales.

A further object of the invention is the provision of a self-unloading wagon that is adapted to separate a portion from the bulk material and apportion it to the distributing conveyor.

Still another object is to provide a self-unloading vehicle that can be readily converted from a bale-unloading vehicle to a forage-unloading vehicle.

Yet another object of the present invention is the provision of a self-unloading wagon that will unload a randomly stacked load of bales in an intact condition.

These and other objects of the invention will become more apparent from the specification and drawings, wherein:

FIGURE 2 is a plan view of the interior of the wagon; and

FIGURE 3 is a schematic view of the wagon's driving system.

Figure 1:
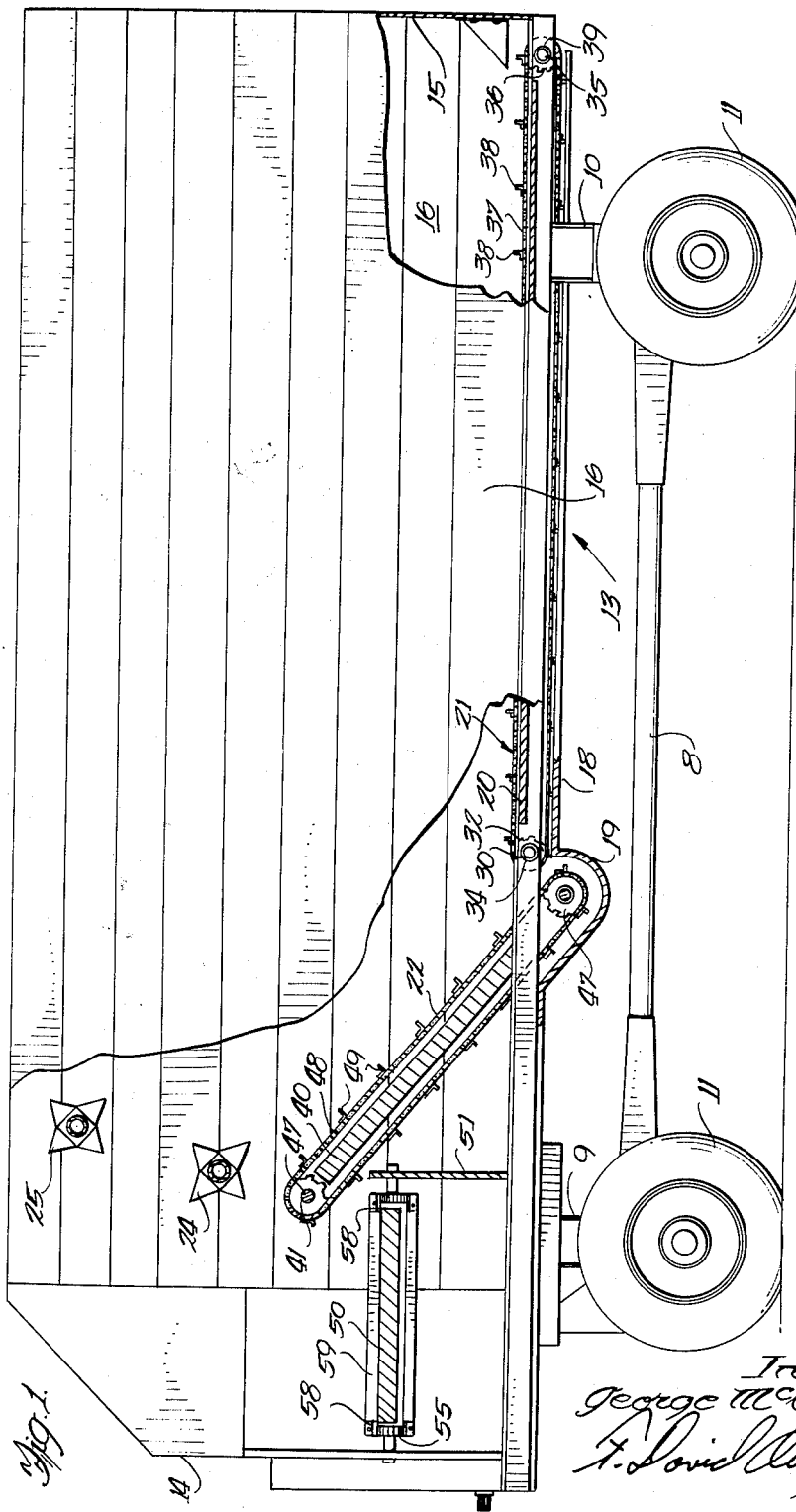
FIGURE 1 is an elevation view of the wagon partially in section.

Describing the invention in detail, the self-unloading vehicle is shown in the form of a wagon having longitudinal frame members 8, front bolsters 9, rear bolsters 10 and four wheels 11, and a wagon tongue 12. Mounted on said bolsters is a wagon body generally designated as 13 which comprises a front 14, a rear 15, and a pair of connecting sides 16. Formed in the right-hand side of the wagon, as you look from the front to the rear of the wagon, is a cross conveyor opening 17. As can be best seen in FIGURE 2, the wagon body has a bottom 18 that is interrupted by a transverse trough 19. Also, in the body portion of the wagon a second bed portion bottom 20 is provided, elevated slightly from the continuous bottom 18.

The wagon is provided with material-moving means comprising a bed conveyor 21, an incline conveyor 22, a cross conveyor 23, a cutting beater 24, and a throwing beater 25. When using the wagon to unload bales or wafers, the cutting and throwing beaters are removed.

The bed conveyor comprises a forward transverse rod 30 mounted in bearings 34 provided in the sides of the wagon bed and includes an end portion 31 extending outwardly from the left-hand side of the wagon as seen in FIGURE 3. Mounted on said forward transverse rod 30 internally of the wagon are a pair of sprockets 32. A drive gear 33 is mounted on the end portion 31 of said forward transverse rod. A rear transverse rod 35 is mounted in bearings 39 located in the side 16 of the wagon. A pair of sprockets 36 are mounted on said rear transverse rod 35 internally of the wagon bed in alignment with said pair of sprockets 32. A pair of endless chains 37 having connecting slats 38 are mounted on the pairs of sprockets 32 and 36 to form the bed conveyor 21.

The inclined conveyor 22 comprises an inclined slab 40 mounted between the sides 16 of the wagon body. An upper roller shaft 41 is mounted in bearings 42, within the upper portion of said inclined slab 40 and has an end portion extending outwardly of the side 16 of the wagon body. Mounted on this end portion is a gear 43 through which motion is supplied to the inclined conveyor, and a sprocket 44 through which motion is transmitted to the beaters. A pair of sprockets 47 are mounted on said upper roller shaft internally of the wagon bed adjacent the sides 16. These sprockets 47 are larger in diameter than the thickness of the inclined slab and, therefore, the peripheral edges of said sprockets protrude above the surface of said inclined slab. A lower roller shaft 45 is mounted in bearings 46 located within the lower portion of said inclined slab. A second pair of sprockets 47 are mounted on the lower roller shaft internally of the wagon bed and adjacent the sides 16 and these likewise protrude above the surface of the inclined slab. A pair of endless chains 48 having connecting slats 49 are mounted over the pairs of sprockets 47 to form the inclined conveyor 22. It should be noted that the lower portion of the inclined slab extends into the transverse trough 19 of the bottom and is located with respect to the bed conveyor 21 such that material being fed from the bed conveyor will fall onto the inclined conveyor.

A transverse horizontal slab 50 is provided across the front of the wagon, between a transverse wall 51 and the wagon's front and sides. Said slab 50 being elevated with respect to the bed portion bottom 20 of the wagon. A first conveyor shaft 52 is mounted in bearings 53 located in the front 14 and the transverse wall 51 of the wagon and has an end portion extending through said front 14 and upon which is mounted a sprocket 56. A pair of sprockets 54 are mounted on said first conveyor shaft internally of the wagon bed and adjacent the front 14 and the transverse wall 51. A second conveyor shaft 57 is mounted in the front 14 and transverse wall 51 of the wagon adjacent the opposite end of the horizontal slab 50, said second conveyor shaft also having a pair of sprockets 55 mounted thereon in alignment with said first pair of sprockets 54. A pair of endless chains 58 having connecting slats 59 are mounted over the pairs of sprockets 54 and 55 to form cross conveyor 23. It should be noted that the upper end of the inclined conveyor overlies the cross conveyor so that material being fed by the inclined conveyor will spill upon the cross conveyor.

A shaft 60 is mounted in bearing 61 located in the side 16 of the wagon body above and to the rear of the upper roller shaft 41 of the inclined conveyor. The shaft 60 is held in its bearing 61 by cotter keys 62 and can be easily removed by removing the cotter keys. A pair of sprockets 63 and 64 are mounted on the end portion of shaft 60, said sprocket 64 being in alignment with the sprocket 44 of the inclined conveyor. A tube 65 having cutting blades 66 is secured to shaft 60 between the side 16 of the wagon body to form the cutting beater 24.

A shaft 70 is mounted in bearing 71 located in the side 16 of the wagon at a position above and to the rear of the shaft 60 of the cutting beater. The shaft 70 has an end portion upon which is secured a sprocket 73 that is in alignment with the sprockets 63 of the cutting beater. This shaft is held in its bearing 71 by cotter keys 72 and can be readily removed by removing the cotter keys. A tube 74 having throwing blades 75 mounted thereon is secured to the shaft 70 between the side 16 of the wagon to form the throwing beaters of the material-conveying system.

Referring now to FIGURES 2 and 3, the drive mechanism for the conveyor system will be described. A power source such as a shaft assembly 8 leading from the power take-off of a tractor supplies power to a gearbox 81 from which a output shaft 82 extends, having a first pulley 83 mounted thereon. Journaled upon the outer side of the wagon is an upper longitudinal shaft 84 having a portion extending beyond the front of the wagon. Mounted upon the end of said upper longitudinal shaft is a second pulley 85 and provided intermediate the ends of said upper longitudinal shaft is a throwout clutch 86 which can be operated through conventional mechanism by the tractor operator. A slack takeup pulley 87 is adjustably mounted on the front portion 14 of the wagon to take up slack in the belt 83. A bevel gear 88 is mounted on the other end of the upper longitudinal shaft 84 and is adapted to convey rotary motion to the gear 43 of the inclined conveyor. A sprocket 89 is mounted on said upper longitudinal shaft intermediate said second pulley and the throwout clutch.

A lower longitudinal shaft 90 is journaled on the outer side of the wagon body 13 and includes a throwout clutch 92 intermediate its ends. A sprocket 91 is mounted on the forward end of said lower longitudinal shaft and a worm gear 93 is mounted on the rearward end of said lower longitudinal shaft. An endless chain 95 is adapted to be mounted over said sprocket 91, sprocket 89 on upper longitudinal shaft 84, and the sprocket 56 of the cross conveyor. A slack takeup sprocket 94 is adjustably mounted on the front 14 of the wagon bed. Thus it is seen the rotary motion is transmitted from the first pulley 83, through V-belt 96, to the upper longitudinal shaft 84 and the rotary motion of the upper longitudinal shaft 84 is then transmitted to the lower longitudinal shaft 90 by the endless chain 95. The slack in the V-belt 96 is adjusted by the slack takeup pulley 87 and the slack in the endless chain 95 is adjusted by the slack takeup sprocket 94. The worm gear 93 of the lower longitudinal shaft cooperates with the drive gear 93 of the bed conveyor to provide uniform rotary motion to the bed conveyor.

An endless chain 67 connects the sprocket 44 on the upper roller shaft 41 to the sprocket 64 on the shaft 60 of the cutting beater and thus transmits rotary motion to the cutting beater 24. A tightening block can be mounted on the side 16 of the wagon bed to adjust the tension in said endless chain 67.

The sprocket 63 mounted on the shaft 60 of the cutting beater is connected to the sprocket 73 that is mounted on the shaft 70 of the throwing beater by an endless chain 98 and rotary motion is thereby transmitted from the cutting beater to the throwing beater. A tightening block can be mounted on the side 16 of the wagon body to adjust the tension in said endless chain 98.

In designing a wagon that will unload randomly stacked bales, it has been found necessary to provide means for drawing off or stripping individual bales from the mass. This has been necessitated because of the tendency of the bales to interlock and jam if such a means is not provided. Also, in designing a wagon such as this, means must be provided to prevent the bales from falling on the dispensing conveyor when the wagon is being loaded. To operate efficiently, bales must be deposited on the dispensing conveyor only when said conveyor is in operation and at a rate that it is adapted to accommodate. Another consideration in designing a wagon that will unload randomly stacked bales, is that it is desirable to dispense the bales at a point above the bottom of the wagon. It was found that an inclined conveyor of the type disclosed accomplishes the main objective and also fulfills the above requirements. However, the inclined conveyor must be at such an angle and have the proper coefficient of friction to manipulate the bales without destroying them. The angle used in conventional forage wagons was found to be too steep since it required a conveyor having a coefficient of friction so high that the bales would be torn open and broken during the unloading process. Conveyors having an inclination in the vicinity of 40° were found to be most effective, the angle can, of course, be varied within a small range depending upon the coefficient of friction of the conveyor surface. A conveyor having an angle of inclination in the vicinity of 40° was found to draw bales from the mass, raise them to and deposit them upon a cross conveyor in an undamaged condition and also provide a front wall of sufficient height to prevent bales from falling on the cross conveyor in the loading and transporting operation.

When using the wagon for forage, grain and the like, the cutting and throwing beaters are installed. The cutting beater cuts and breaks up the compact material found at this level in the wagon, while the throwing beater directs the loose material located at the top of the mass forwardly and down onto the cross conveyor.

The throwout clutches 86 and 92 are located so that power to the inclined conveyor and the bed conveyor can be manually controlled by the operator. This has been found to be advantageous in starting the unloading process or in dislodging a bale jam. In starting the unloading process the clutch 92 will be disengaged and thus only the inclined conveyor and the cross conveyor will be operative. As the material in the front of the wagon is dispensed, clutch 92 can then be engaged and the bed conveyor 21 will begin moving material from the rear toward the front of the wagon. If the operator feels material is being fed to the inclined conveyor at too fast a rate he can control the rate by disengaging and engaging the bed conveyor clutch.

Thus it is seen that a universal self-unloading wagon has been provided to unload material such as forage or grain and also material such as randomly stacked bales or wafers.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A self-unloading wagon for such materials as forage, hay wafers, and random stacked bales, comprising: a chassis; wheels supporting said chassis; a wagon body on said chassis, said wagon body having a discharge end; an endless, apron-type bed conveyor in said body operable to move said material toward said discharge end; an endless, inclined, apron-type elevator conveyor in said body adjacent said bed conveyor for elevating material carried by said bed conveyor, said elevator conveyor being inclined upwardly toward said discharge end at an angle of about forty degrees relative to said bed conveyor, said elevator conveyor being operable to move said material toward said discharge end; rotary forage beater means mounted on said body adjacent the upper end of said elevator conveyor, said beater means being movable to a position clear of said elevator conveyor upper end to allow passage of bales when said wagon is used as a bale wagon; power supply means for said wagon connected to said bed conveyor and to said elevator conveyor, said power supply means including an independent control for bed conveyor and an independent control for said elevator conveyor, so that said bed conveyor and said elevator conveyor can be operated independently of one another to provide an orderly, one-by-one discharge of random stacked bales from said wagon when said wagon is used as a bale wagon.

2. A self-unloading wagon as recited in claim 1, wherein: an endless, apron-type cross conveyor extends transversely to said elevator conveyor at the discharge end thereof, said cross conveyor being located below the upper end of said elevator conveyor.

3. A self-unloading wagon as recited in claim 2, wherein: said cross conveyor includes an active run and a return run and said active run is located above said bed conveyor.

4. A self-unloading wagon for such materials as forage, hay wafers, and random stacked bales, comprising: a chassis; wheels supporting said chassis; a wagon body on said chassis, said wagon body having a discharge end; an endless, apron-type bed conveyor in said body operable to move said material toward said discharge end; an endless, inclined, apron-type elevator conveyor in said body adjacent said bed conveyor for elevating material carried by said bed conveyor, said elevator conveyor being inclined upwardly toward said discharge end at an angle of less than forty degrees relative to said bed conveyor, said elevator conveyor being operable to move said material toward said discharge end; rotary forage beater means mounted on said body adjacent the upper end of said elevator conveyor, said beater means being movable to a position clear of said elevator conveyor upper end to allow passage of bales when said wagon is used as a bale wagon; power supply means for said wagon connected to said bed conveyor and to said elevator conveyor, said power supply means including an independent control for bed conveyor and an independent control for said elevator conveyor, so that said bed conveyor and said elevator conveyor can be operated independently of one another to provide an orderly, one-by-one discharge of random stacked bales from said wagon when said wagon is used as a bale wagon.

5. A self-unloading wagon as recited in claim 4, wherein: an endless, apron-type cross conveyor extends transversely to said elevator conveyor at the discharge end thereof, said cross conveyor being located below the upper end of said elevator conveyor.

6. A self-unloading wagon as recited in claim 5, wherein: said cross conveyor includes an active run and a return run and said active run is located above said bed conveyor.

References Cited by the Examiner
UNITED STATES PATENTS

| | | | |
|---|---|---|---|
| 2,676,002 | 4/54 | Wolfe | 214—519 X |
| 2,743,832 | 5/56 | Kappelmann | 214—519 |
| 2,750,059 | 6/56 | Hintz et al. | 214—519 |
| 2,756,887 | 7/56 | Raney et al. | 214—519 |
| 2,771,203 | 11/56 | Collins et al. | 214—519 |
| 2,822,947 | 2/58 | Van Wyhe | 214—522 |
| 3,037,780 | 6/62 | Skromme et al. | 214—519 X |
| 3,044,641 | 7/62 | Code | 214—520 X |
| 3,047,173 | 7/62 | Raney | 214—519 |

GERALD M. FORLENZA, *Primary Examiner.*

HUGO O. SCHULZ, *Examiner.*